United States Patent
Gosselin et al.

(10) Patent No.: US 8,644,470 B2
(45) Date of Patent: Feb. 4, 2014

(54) METHODS AND SYSTEMS FOR IMPROVED CALLER NAME IDENTIFICATION ON A TELEPHONE NETWORK

(75) Inventors: Mark H. Gosselin, Seattle, WA (US); Thomas P. Maliska, Jr., North Thurston County, WA (US)

(73) Assignee: Cequint, Inc., Seattle, WA (US)

( * ) Notice: Subject to any disclaimer, the term of this patent is extended or adjusted under 35 U.S.C. 154(b) by 1261 days.

(21) Appl. No.: 12/191,892

(22) Filed: Aug. 14, 2008

(65) Prior Publication Data

US 2009/0257575 A1    Oct. 15, 2009

Related U.S. Application Data

(60) Provisional application No. 61/045,204, filed on Apr. 15, 2008.

(51) Int. Cl.
*H04M 1/56* (2006.01)
*H04M 3/42* (2006.01)

(52) U.S. Cl.
USPC ....................... 379/142.06; 455/415

(58) Field of Classification Search
USPC ............... 379/88.01–88.28, 142.06, 207.02, 379/207.15
See application file for complete search history.

(56) References Cited

U.S. PATENT DOCUMENTS

| | | | |
|---|---|---|---|
| 4,894,861 A | 1/1990 | Fujioka | |
| 4,924,496 A | 5/1990 | Figa et al. | |
| 5,210,789 A | 5/1993 | Jeffus et al. | |
| 5,220,599 A | 6/1993 | Sasano et al. | |
| 5,265,145 A | 11/1993 | Lim | |
| 5,446,785 A | 8/1995 | Hirai | |
| 5,490,205 A | 2/1996 | Kondo et al. | |
| 5,506,894 A | 4/1996 | Billings et al. | |
| 5,506,895 A | 4/1996 | Hirai et al. | |
| 5,546,447 A | 8/1996 | Skarbo et al. | |
| 5,727,057 A | 3/1998 | Emery et al. | |
| 5,734,706 A | 3/1998 | Windsor et al. | |
| 5,754,636 A | 5/1998 | Bayless et al. | |
| 5,771,283 A | 6/1998 | Chang et al. | |
| 5,805,677 A | 9/1998 | Ferry et al. | |
| 5,867,562 A | 2/1999 | Scherer | |

(Continued)

FOREIGN PATENT DOCUMENTS

| | | |
|---|---|---|
| EP | 0876038 | 11/1998 |
| EP | 0920169 | 6/1999 |

(Continued)

OTHER PUBLICATIONS

"CNAM Definition from PC Magazine Encyclopedia," PC Magazine Encyclopedia, 1981-2011, pp. 1-2, The Computer Language Company Inc., http://www.pcmag.com/encyclopedia_term.

(Continued)

*Primary Examiner* — Fan Tsang
*Assistant Examiner* — Jeffrey Lytle
(74) *Attorney, Agent, or Firm* — Lowe Graham Jones PLLC

(57) ABSTRACT

A phone network in a wireless environment that does not perform CNAM queries when a number is already stored in the receiving handsets' caller directory. CNAM query fees are charged only to obtain caller information on a new caller. The network does not make CNAM queries when the caller information is already available, whether in the contact information stored on the receiver's handset or through some other reliable source.

17 Claims, 3 Drawing Sheets

(56) References Cited

U.S. PATENT DOCUMENTS

| | | | |
|---|---|---|---|
| 5,930,701 A | 7/1999 | Skog | |
| 5,982,867 A | 11/1999 | Urban et al. | |
| 6,046,687 A | 4/2000 | Janky | |
| 6,075,850 A | 6/2000 | Ali et al. | |
| 6,108,408 A | 8/2000 | Plunkett et al. | |
| 6,353,664 B1 | 3/2002 | Cannon et al. | |
| 6,366,670 B1 | 4/2002 | Davis et al. | |
| 6,449,351 B1 | 9/2002 | Moss et al. | |
| 6,590,965 B1 * | 7/2003 | Poole et al. | 379/88.19 |
| 6,643,516 B1 | 11/2003 | Stewart | |
| 6,714,639 B1 | 3/2004 | Bedingfield et al. | |
| 6,799,033 B2 | 9/2004 | Kanefsky | |
| 6,813,344 B1 | 11/2004 | Lemke | |
| 6,975,712 B1 | 12/2005 | Schnarel et al. | |
| 6,985,572 B2 | 1/2006 | Gosselin | |
| 7,016,482 B2 | 3/2006 | Moss et al. | |
| 7,085,257 B1 * | 8/2006 | Karves et al. | 370/352 |
| 7,155,211 B2 | 12/2006 | Mun et al. | |
| 7,170,984 B2 | 1/2007 | Gosselin | |
| 7,170,985 B2 | 1/2007 | Gosselin | |
| 7,200,212 B2 | 4/2007 | Gosselin | |
| 7,215,750 B2 | 5/2007 | Nguyen et al. | |
| 7,236,576 B2 * | 6/2007 | Schnarel et al. | 379/142.01 |
| 7,388,949 B2 | 6/2008 | Contractor et al. | |
| 7,623,849 B2 | 11/2009 | Zellner | |
| 7,756,259 B2 | 7/2010 | Martin | |
| 2001/0001012 A1 | 5/2001 | Culli et al. | |
| 2002/0128012 A1 | 9/2002 | Kim et al. | |
| 2002/0159574 A1 | 10/2002 | Stogel | |
| 2003/0041030 A1 | 2/2003 | Mansfield | |
| 2003/0063730 A1 | 4/2003 | Woodring | |
| 2003/0092432 A1 | 5/2003 | Hwang | |
| 2003/0147518 A1 * | 8/2003 | Albal et al. | 379/207.15 |
| 2004/0066920 A1 | 4/2004 | Vandermeijden | |
| 2004/0203556 A1 * | 10/2004 | Litwin | 455/403 |
| 2005/0249343 A1 * | 11/2005 | Birch | 379/142.01 |
| 2006/0089165 A1 | 4/2006 | Smith et al. | |
| 2006/0112167 A1 | 5/2006 | Steele et al. | |
| 2006/0234703 A1 | 10/2006 | Wuthnow et al. | |
| 2007/0127656 A1 | 6/2007 | Citron et al. | |
| 2007/0133771 A1 * | 6/2007 | Stifelman et al. | 379/142.01 |
| 2008/0059642 A1 | 3/2008 | Bhogal et al. | |
| 2008/0084982 A1 * | 4/2008 | Chatterjee | 379/201.01 |
| 2008/0240383 A1 | 10/2008 | Fronczak et al. | |
| 2008/0242293 A1 * | 10/2008 | Gosselin | 455/425 |
| 2008/0304647 A1 * | 12/2008 | Ikemori et al. | 379/207.02 |
| 2010/0075644 A1 | 3/2010 | Gosselin et al. | |
| 2010/0222028 A1 | 9/2010 | Gisby et al. | |
| 2010/0261459 A1 | 10/2010 | Gosselin et al. | |
| 2010/0261461 A1 | 10/2010 | Gosselin et al. | |
| 2010/0261462 A1 | 10/2010 | Gosselin et al. | |

FOREIGN PATENT DOCUMENTS

| | | |
|---|---|---|
| EP | 1124387 | 8/2001 |
| EP | 1199899 | 4/2004 |
| EP | 1551201 | 7/2005 |
| GB | 2405768 | 1/2008 |
| JP | 4086144 | 3/1992 |
| JP | 4248739 | 9/1992 |
| JP | 09064960 | 3/1997 |
| JP | 9321856 | 12/1997 |
| JP | 10276257 | 10/1998 |
| JP | 2002044221 | 2/2002 |
| JP | 2002305602 | 10/2002 |
| JP | 2005198218 | 7/2005 |
| KR | 1020010027839 | 6/2001 |
| KR | 1020050071947 | 8/2005 |
| KR | 1020090043274 | 6/2009 |
| WO | 9717793 | 5/1997 |
| WO | 0229665 | 4/2002 |
| WO | 2004023767 | 3/2004 |
| WO | 2006024952 | 3/2006 |
| WO | 2007056577 | 5/2007 |
| WO | 2007095963 | 8/2007 |
| WO | 2008122052 | 10/2008 |
| WO | 2010120607 | 10/2010 |
| WO | 2010120610 | 10/2010 |

OTHER PUBLICATIONS

"Want to know Who's Calling? Hear the name and number announced before you answer!" ClassCo—The VoiceAnnounce Technology Company, 1 page, printed Mar. 25, 2011, http://www.voiceannounce.com.

"Calling Name Delivery (CNAM)," Cisco PGW 2200 Softswitch, Cisco Systems, 2007, pp. 1-13, http://www.cisco.com.

TIA TIA-764 TIA/EIA-41-D Enhancements for Wireless Calling Name Feature Descriptions, Telecommunications Industry Association; Jan. 1, 2002; IHS, Inc.; http://electronics.ihs.com/document/abstract; 1 page.

"Recommended GPS Navigator" Consumer Reports News, GPS and GPS Ratings from Consumer Reports, ConsumerReports.org, 2005-2011, pp. 1-2, http://news.consumerreports.org.

"GPS Location, Can Someone Track me on my Phone?" SprintUsers.com, Sep. 27, 2004, pp. 1-5, vBulletin, v.3.8.4, 2002-2007, Jelsoft Enterprises Ltd.

Nathalie Fiset, "Cellular GPS Phone Tracking," Ezine @rticles, Jan. 28, 2007, pp. 1-4, http://ezinearticles.com/?Cellular-GPS-Phone-Tracking&id=434437.

Matoba, N. and Yoshida, S. (1996), "Still image transmission using unequal error protection coding in mobile radio channel. Electronics and Communications in Japan (Part 1: Communications)," Mar. 23, 2007, 79: 75-85. http://onlinelibrary.wiley.com/doi/10.1002/ecja.4410790408/abstract.

"Show Your Facebook or MySpace Pic as Picture Caller ID!" PicDial Make Your Address Book Socially Aware!, Mar. 25, 2011, IQzone, Inc.; http://www.picdial.com.

"Frequently Asked Questions About Mobile to Mobile Calling," Residential Support Wireless Phone, 2011, Verizon, http://wireless-supportverizon.com/faqs/Calling+Plans/faq__in__calling.html.

"Sprint Cell Phone Reverse Lookup Downloads," FileHeap! Where People Get Files, pp. 1-4, 2000-2010, http://www.fileheap.com/dbquery/1/sprint+cell+phone+reverse+lookup+downloads.

Berg, Andrew; "Tap Me Offers In-Game Ad Platform," Wireless Week, pp. 1-2, Feb. 28, 2011, http://www.wirelessweek.com/News/2011/02/Business-TapMe-In-Game-Ad-Platform-Mobile-Content/.

VeriSign Authentication Services—The Leading Provider of SSL. printed Mar. 25, 2011, Symantec Corporation, http://www.verisign.com; cc 2011.

Wireless, Wherify.com, www.wherify.com/html/faq.asp-?pageID=13; 1 page, printed Mar. 29, 2011; cc 2011.

\* cited by examiner

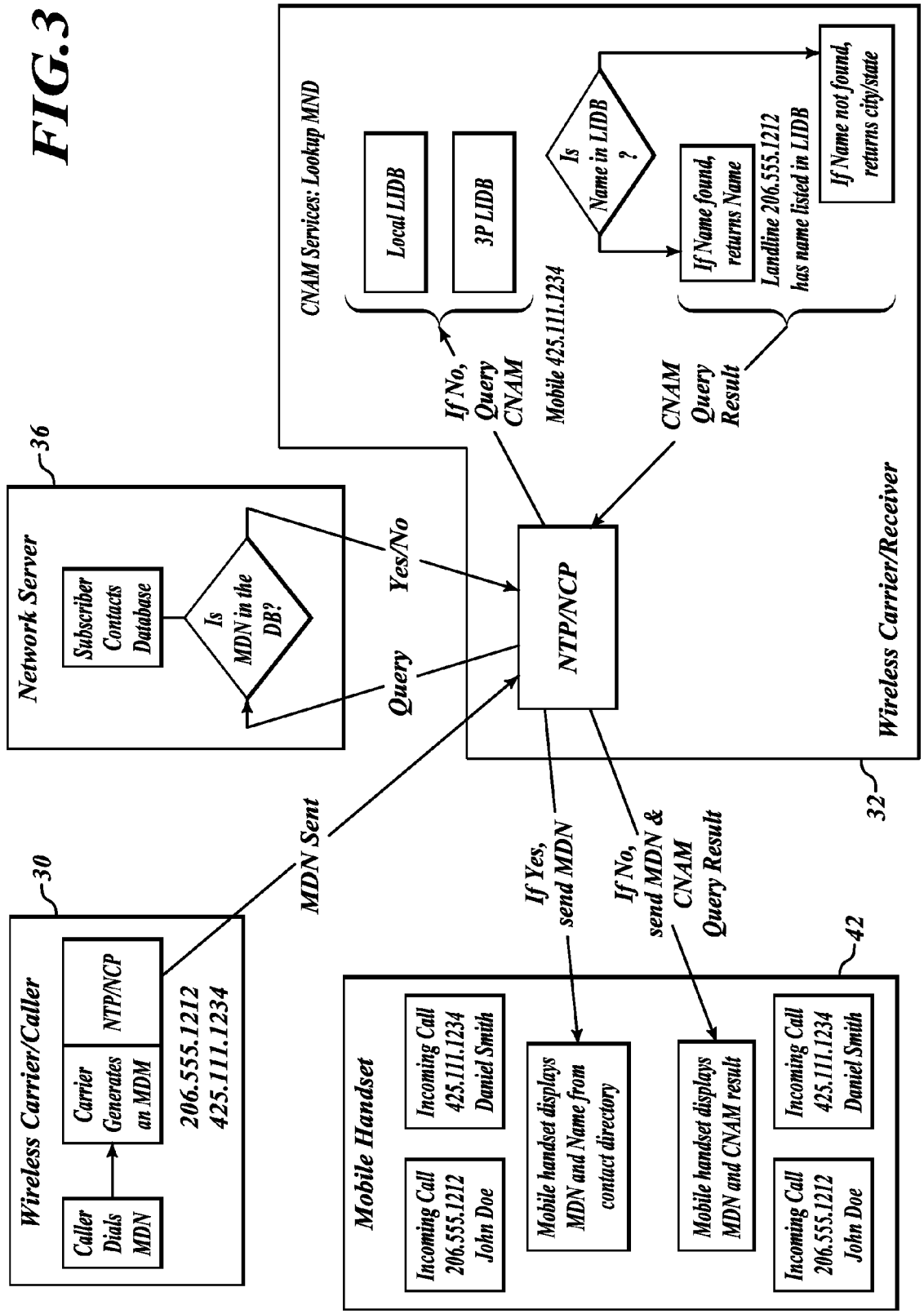

METHODS AND SYSTEMS FOR IMPROVED CALLER NAME IDENTIFICATION ON A TELEPHONE NETWORK

PRIORITY CLAIM

This application claims the benefit of U.S. Provisional Application Ser. No. 61/045,204 filed Apr. 15, 2008, the contents of which are hereby incorporated by reference.

BACKGROUND OF THE INVENTION

Traditional caller name identification on mobile telephone networks is performed in a network architecture using a pair of service points known as a network control point (NCP) and a network termination point (NTP). Essentially the NTP manages signal traffic for terminating and connecting calls between carrier networks and to their subscribers. The NCP manages subscriber accounts and informatics for callers, including network-based caller information services. This architecture permits various carrier networks to interoperate and to evaluate and apply appropriate rules using the caller and receiver telephone numbers (such as billing and roaming rates, etc.). Caller identification services may be applied at this juncture, as well, provided that the caller identification information associated with the caller's telephone numbers can be obtained quickly so as not to delay the call flow (such as initiation, connection, and termination of the call) between the carrier networks and, ultimately, connection to the receiver's handset. One standard for such caller identification services is Caller Name (CNAM). An example of a CNAM service is offered by Verisign® (CITE VERISIGN DOCUMENTS). Other CNAM providers include products and services from Targus® and Syniverse®.

CNAM provides caller name and city/state locations by querying a high speed, high volume database (DB), referred to as a line information database (LIDB). CNAM services provide information about the calling party for a fee, typically billed to the subscriber's account. The fee varies by contract but is typically $0.01 per call. CNAM traffic on a telephone carrier network is also high volume. A hypothetical carrier with twenty million subscribers making seven calls on average per day results in 140 million possible CNAM transactions on a dedicated network. As there are many carriers in telephony, and many subscribers that maintain more than one phone line, the CNAM market has grown from servicing only land-line Public Switched Telephone Networks (PSTN) to include other communication networks, such as mobile and voice over Internet Protocol (VoIP) telephony. Thus, there is the potential for well over a billion CNAM transactions per day. In operation, a CNAM service takes an incoming call from the NTP, sends call information (including the caller's number and the dialed number) into the NCP, determines that the query can be billed to the subscriber, determines which carrier the inbound call is coming from, makes the query to a service which can query name and phone number databases (such as the Line Information Database (LIDB) of the caller's carrier), resolves a name or a city/state pair for a phone number transiting the network, and send that information along with the caller's Mobile Dialable Number (MDN) to the receiving handset for display when the call is received (typically during the incoming call ring).

Typically, a CNAM query is completed in less than 2 seconds. This permits the caller to experience normal "ring tones" during the call, with no perceived delay to the calling parties, and for the calling handset to have its call connected to the receiver in a reasonable amount of time. Once terminated on the receiving carrier's network termination point (NTP), the CNAM query result is sent as a text string along with the caller's CID to the receiver's phone and placed on the display of the receiving handset. While it is possible to make CNAM queries from the receiving handset, any significant delay placed upon the recipient of the incoming call by making a CNAM query from the mobile handset may create an unacceptable calling experience to one or both of the calling parties, such as a delay in the call termination for the calling party or a delay in the display of the caller information to the receiving party. In the case of a CNAM query from the receiving handset, the perceived delay occurs because the query is commenced after the network termination point (NTP) has connected the call to the receiving handset. With such a delay, the user may thus answer the call, or may choose to ignore the call, before the caller information is transmitted to the handset.

SUMMARY OF THE INVENTION

The present invention provides a phone network in a wireless environment that does not perform CNAM queries when a number is already stored in the receiving handsets' caller directory. CNAM query fees are charged only to obtain caller information on a new caller. The network does not make CNAM queries when the caller information is already available, whether in the contact information stored on the receiver's handset or through some other reliable source.

BRIEF DESCRIPTION OF THE DRAWINGS

Preferred and alternative examples of the present invention are described in detail below with reference to the following drawings:

FIG. 3 illustrates an example of the system in operation.

DETAILED DESCRIPTION OF THE PREFERRED EMBODIMENT

The present invention adds some architectural (software and/or hardware) components to a carrier network in the form of a database and query logic to determine whether a CNAM query is needed in order to provide caller identification information.

Figure 1:
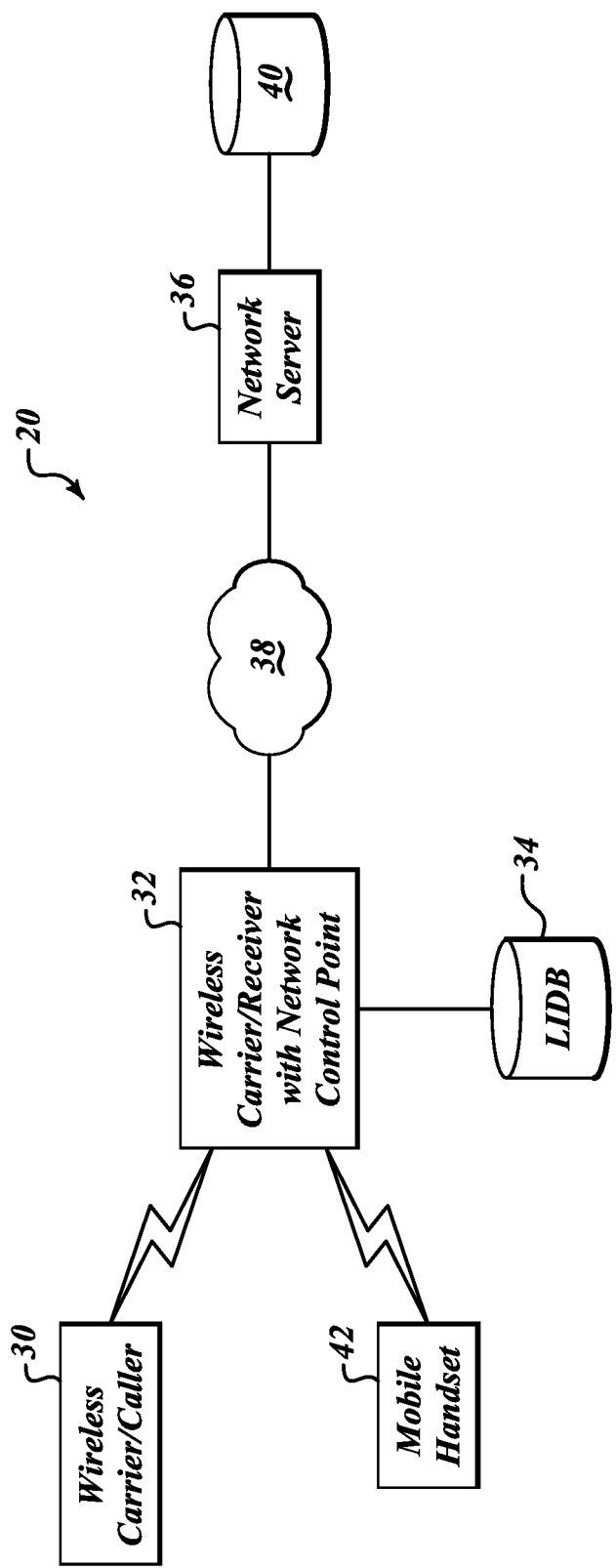
FIG. 1 is a schematic block diagram of an example system formed in accordance with an embodiment of the present invention.

As shown in FIG. 1, an example wireless environment 20 includes a caller system 30, a receiver system (network control point (NCP)) 32, a data network 38, a network server 36, a database 40, a Line Information Database (LIDB) 34 and a mobile handset (receiving device) 42. The caller system 30 sends a call destined for the mobile handset 42 to the NCP 32. The NCP 32 sends the caller number (CID) included in the call to the network server 36 over the data network 38. The network server 36 queries the database 40 to determine if the database 40 indicates that a (CNAM) query is not needed because the mobile handset 42 already includes MDN information pertaining to the CID stored locally in the mobile handset 42. If the MDN is not stored in the mobile handset 42, then a traditional CNAM query is performed using the CID.

In one embodiment, the system above performs a traditional CNAM query based on an incoming number over a carrier network, which allows the carrier to supply the CID and the CNAM associated with the CID in a string for display on the mobile handset 42 when the call is received. This number and name can then be stored in the mobile handset caller directory for later reference. Alternatively, the owner of the receiving handset can enter or import contact information including names and telephone numbers into the handset.

When the network termination point NTP indicates that a call is in progress, dialing information is sent to the NCP 32. The NCP 32 checks each incoming call CID against the database 40 associated with that NCP 32 or the network server 36 accessible with the NCP 32. A table stored in the database 40 contains a copy of the receiving handset's caller directory (i.e., Mobile Directory Number (MDN)). At a minimum the table stores telephone numbers that were previously received by the mobile handset 42. The caller directory list may be in a database table that is co-located with the NCP 32, distributed on the carrier network, or on a network-addressable memory or storage device. The NCP 32 queries the caller directory table to determine whether the calling MDN is already stored in the caller directory (i.e., contact list) of the mobile handset 42. Using the query result (Yes or No), the NCP 32 performs CNAM queries for numbers (incoming call, i.e. calling MDN) which are not already contained in the caller directory table, and does not perform a CNAM query when the calling MDN is associated with an MDN stored in the caller directory table.

In one embodiment, the mobile handset's caller directory table is updated via a network message (e.g. short message service (SMS) message or via the carrier's data network) sent from the mobile handset 42 each time an MDN is modified (added or subtracted) in the caller directory stored on the mobile handset 42. A small client software component operating on the mobile handset 42 sends the phone numbers for those contacts which are stored in the mobile handset caller directory (also called the mobile user's 'contacts' or 'address book') to the network server 36. The network server 36 stores the received information in the caller directory table in the database 40 when received. A CNAM query may be made and the result stored by the client software on the receiving handset 42 based on detected modifications to caller directory entries on the handset. Also, the information in the caller directory on the receiving handset 42 may also be refreshed periodically, by making CNAM queries either on a set period of time (e.g., every six months), or based on a certain count of incoming calls from that number (e.g., request a CNAM query to check the accuracy of the caller directory information (i.e., synchronizing the directory table with the caller directory on the mobile handset 42) every 15$^{th}$ time the caller's MDN is detected on an incoming call). The above techniques maintain the accuracy of the caller information on the mobile handset 42 should names and/or phone numbers change, while avoiding CNAM queries for every call and intelligently using CNAM to maintain the accuracy of caller information in the caller directory.

In an alternate embodiment, privacy or network access restrictions may prevent copying the mobile handset caller directory to the caller directory table on the network server 36. In this case, the table is updated with caller information only when an incoming call to the receiving handset 42 is made, the inbound number is recorded when the call is terminated. When a CNAM query is made, the resulting text string (containing the caller name and/or city/state information) is stored in the caller directory table. The first time a number is received (not in caller directory table), a CNAM query is made. Thereafter, no CNAM query need be made if the table contains those records. Caller identification information may be sent from the table directly to the receiving handset 42 or it may be assumed that the user previously stored the number and caller identification information that resulted from the initial call. In the latter case, the calling party is identified using the information stored locally on the mobile handset 42.

The client software on the receiving handset 42 may also include a feature that encourages subscribers to move call list entries to the contact database (caller directory) on the handset 42 and provides an indication to the software to update the contact list in the database 40.

The client software on the receiving handset 42 may also include a feature that automatically moves call list entries to the contact database on the handset 42 and provides an indication to the software to update the contact list in the database 40 with those entries.

The client software on the receiving handset 42 may also include a feature that automatically moves an inbound call's MDN directly into the contact database on the handset 42 and provides an indication to the client software to update the contact list in the database 40 with those entries.

On receiving the indication to update the contact list in the database 40, the client software on the receiving handset 42 sends an indication that an MDN has been stored in the contact database on the handset 42. This can take the form of sending any stored MDNs back to the network server 36 or sending a confirmation.

The contact list in the database 40 may also store all incoming MDNs and received caller identification information regardless of whether the receiving handset 42 stores the MDN in the local contact database. Thereafter, the client software on the receiving handset 42 may cooperate with the contact list in the database 40 by providing an indication for each MDN stored in the contact database on the receiving handset 42 rather than exchanging the caller information itself.

Similarly, the list of numbers associated with the subscriber in the contact list in the database 40 can be checked against the list stored in the directory on the handset 42 periodically and refreshed using CNAM services as described herein. The caller name information does not need to be requested by the carrier if it is available on the receiving handset. Only telephone numbers that are stored on the receiving handset need to be checked prior to determine if a CNAM query should be made.

The present invention is described for mobile networks but works for mobile, VoIP and traditional telephone networks provided there is a source for the network caller directory information (operating in the manner of the contact directory in a mobile handset described herein), an identifier or telephone number associated with the caller, and a communications carrier that provides network access to CNAM services.

Figure 2:
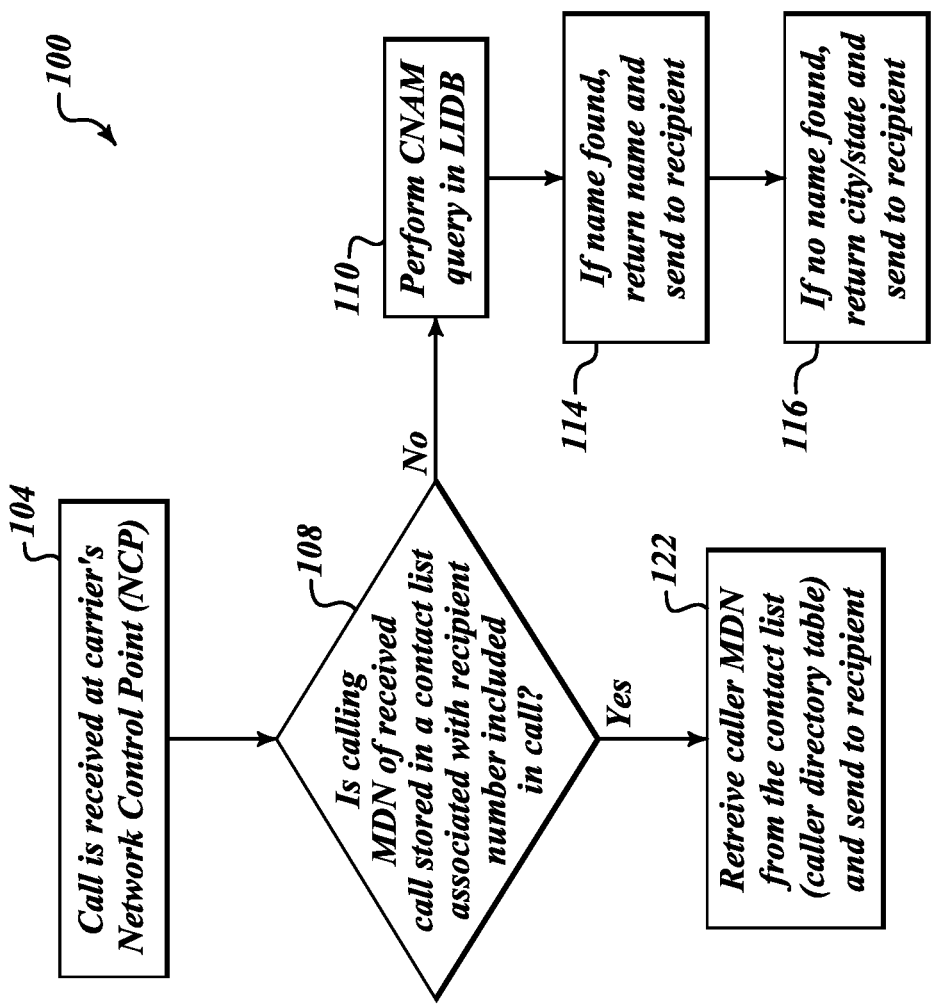
FIG. 2 illustrates a flow diagram of an example method performed by the system shown in FIG. 1.

FIG. 2 illustrates an example method 100 performed by the system shown in FIG. 1. First at a block 104 a call is received at the NCP 32 of a mobile carrier. Next, at a decision block 108, the NCP 32 or the network server 36 determines if the MDN of the received call is stored (associated with) contact information (table) stored in the database 40. If it is determined that the MDN is stored in the database 40, then CID information included in the database 40 is retrieved from the database 40 and sent to the recipient with the call. When the receiving handset 42 receives the call with the CID information, the CID information is displayed/outputted to the user. Where CID information is not stored in the database 40, then an indicator is sent with the call to the recipient. When the receiving handset 42 receives the call with the indicator, the CID information is retrieved from the local caller directory (contact list) and displays/outputs it to the user.

If at the decision block 108 the NCP 32 or the network server 36 determines that the MDN of the received call is not stored (associated with) contact information (table) stored in the database 40, then at a block 110 a CNAM query is executed using the LIDB 34. At a block 114, if the CNAM query finds an associated CID, then that CID is sent to the recipient with the call. At a block 116, if the CNAM query does not find an associated CID, then the MDN of the sender is used to determine city/state information. The city/state information is then sent to the recipient with the call.

FIG. 3 illustrates examples of the how the wireless environment 20 of FIG. 1 operates. In a first example, callers from first and second MDNs (206.555.1212, 425.111.1234) are analyzed at the NCP 32 and the network server 36. It is determined that corresponding records exist in the subscriber contacts database (the database 40). In this example, the mobile handset 42 displays the MDNs and associated names from the contact directory of the mobile handset 42.

In another example, the first and second MDNs (206.555.1212, 425.111.1234) do not have corresponding records in the subscriber contacts database (the database 40). The NCP 32 looks in the LIDB 34 for CNAM information. In this example, if CNAM information exists in the LIDB 34 for the MDNs (206.555.1212, 425.111.1234), the NCP 32 sends the MDNs and CNAM query results to the mobile handset 42 for display. For the MDN 206.555.1212, if CNAM information does not exist in the LIDB 34, the MDN is used to determine city and/or state information that is communicated along with the MDN to the mobile handset 42 for display/output. Note that the LIDB may be that of the subscriber's carrier (for in-network calls) or a third party carrier's LIDB (containing information on subscribers on other communication networks). CNAM services typically service caller information on one or more LIDBs to provide service to subscribers; this also permits them to aggregate access to the LIDBs to relieve the burden on the independent carriers and permit them to interoperate without having to maintain their own high speed database services for CNAM.

Although atypical of CNAM as traditionally offered, the present invention could also be practiced based on the caller's contact information being maintained in a contact list on database accessible by the NCP at the caller's carrier. A CNAM operation can be initiated on the caller's side, and the decision to query CNAM made using lists in caller directories associated and/or accessed over the network by the NCP of the caller's carrier. A CNAM query made in reference to the caller's contact list would then pass on the resulting caller name information without charge to the receiving party. This would be advantageous to the caller, such as a business enterprise, in that the call information and branding (e.g., corporate name) about their business can be maintained correctly by providing caller information to the caller's contacts. This would also permit private parties to share their contact information without the risk of spoofing or user error—since the information is provided in the first instance by CNAM, not the caller (assuming that the CNAM information is accurate, and properly stored in their caller directory on their handset). The present invention would permit this without undue expense to the calling party, since the caller information in the online directory would indicate that the receiving party already received the calling parties' information (since the receiving party is already stored in the caller's contact list). It is also noted that while calling on voice channels is the preferred embodiment, the present invention could be used to manage the CNAM queries and place sender identification information in incoming messages to devices on mobile networks, including SMS, email, data traffic, and so forth.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method performed on a communications network, the method comprising:
    receiving an incoming call for the subscriber at a carrier network, the incoming call comprising caller information;
    prior to connecting the incoming call to the subscriber's mobile device,
        comparing caller information included in the incoming call to contact list information associated with the subscriber's mobile device and stored in a networked directory database accessible from the carrier network;
        performing a Caller Name (CNAM) query only if the caller information does not match an entry in the contact list information;
    connecting the incoming call to the subscriber's mobile device, wherein connecting the incoming call includes transmitting the results of the CNAM query only if the CNAM query was performed; and
    synchronizing the contact list information from the networked directory database with the contact list information from the subscriber's mobile device.

2. The method of claim 1, wherein the results of the CNAM query include one of caller identification information or city and state information associated with the received call.

3. The method of claim 1, further comprising automatically updating the contact list information in the networked directory database.

4. The method of claim 3, wherein automatically updating comprises:
    if a change to the contact list information from the subscriber's mobile occurs, generating a message at the subscriber's mobile device;
    sending the generated message to the carrier network; and
    synchronizing the contact list information in the networked directory database with the contact list information from the subscriber's mobile device based on the received message.

5. The method of claim 4, wherein synchronizing the contact list information in the networked directory database includes one of additions or deletions of information.

6. The method of claim 1, further comprising:
    if the caller information included in the incoming call matches the contact list information stored in the networked directory database, connecting the incoming call to the subscriber's mobile device further includes transmitting an indicator that CNAM information associated with the incoming call is already included in the contact list information on the subscriber's mobile device; and
    presenting caller information on the subscriber's mobile device.

7. The method of claim 6, wherein the sent indicator is a Mobile Dialable Number (MDN).

8. The method of claim 1, further comprising periodically updating contact list information in the subscriber's mobile device by making at least one CNAM query of information included in the contact list information and making any adjustments to the contact list information based on the at least one CNAM query.

9. A system comprising:
a networked database accessible from a carrier network associated with a subscriber's mobile device configured to synchronize contact list information on the subscriber's mobile device;
a network control point configured to:
receive an incoming call for the subscriber;
prior to delivering the incoming call to the subscriber, compare caller information included in the incoming call to contact list information stored in the networked directory database;
if the caller information does not match an entry in the contact list information, perform a Caller Name (CNAM) query;
connect the incoming call to the subscriber's mobile device and transmit the results of the CNAM query only if the query was performed; and
synchronize the contact list information from the networked directory database with the contact list information from the subscriber's mobile device.

10. The system of claim 9, wherein the results of the CNAM query include one of caller identification information or city and state information associated with the received call.

11. The system of claim 9, further comprising a mobile device comprising a client component configured to initiate an automatic synchronization of the contact list information in the networked directory database.

12. The system of claim 11, wherein the mobile device is configured to
initiates the automatic update by generating a message at the mobile device if a change to the contact list information from the subscriber's mobile occurs; and
send the generated message to the network control point.

13. The system of claim 12, wherein the network control point synchronizes the contact list information in the networked directory database based on the received message.

14. The system of claim 12, wherein the network control point is configured to synchronize the contact list information in the networked directory database by adding or deleting information.

15. The system of claim 9, wherein the mobile device comprising an output device configured to present caller information based on one of the transmitted results of the CNAM query or contact list information on the subscriber's mobile.

16. The system of claim 15, wherein the transmitted results of the CNAM query is a Mobile Dialable Number (MDN).

17. The system of claim 9, further comprising a component configured to periodically updating contact list information stored in the subscriber's mobile device by making at least one CNAM query and making any adjustments to the contact list information stored in the subscriber's mobile device based on the at least one CNAM query.

* * * * *